United States Patent
Shetty et al.

(10) Patent No.: US 8,195,204 B1
(45) Date of Patent: Jun. 5, 2012

(54) METHOD AND APPARATUS FOR SCANNING SECTORS IN ORDER OF DISTANCE FROM MOBILE STATION

(75) Inventors: Manoj Shetty, Overland Park, KS (US); Sachin R. Vargantwar, Overland Park, KS (US); Siddharth S. Oroskar, Overland Park, KS (US); Ashvini G. Canjeevaram, Overland Park, KS (US); DeveshKumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1349 days.

(21) Appl. No.: 11/828,077

(22) Filed: Jul. 25, 2007

(51) Int. Cl.
*H04W 68/00* (2009.01)

(52) U.S. Cl. ............... 455/458; 455/456.1; 455/160.1; 455/434; 455/442; 455/441; 455/67.1; 455/443; 370/500; 370/338; 370/328; 375/145; 375/227

(58) Field of Classification Search ............ 455/456.1, 455/101, 63.2, 226.1, 434, 442, 441, 67.1, 455/443; 370/500, 338, 328; 375/145, 227
See application file for complete search history.

(56) References Cited

U.S. PATENT DOCUMENTS

| | | |
|---|---|---|
| 4,765,753 A | 8/1988 | Schmidt |
| 5,392,331 A | 2/1995 | Patsiokas et al. |
| 5,434,950 A | 7/1995 | Kaallman |
| 5,459,759 A | 10/1995 | Schilling |
| 5,508,708 A | 4/1996 | Ghosh et al. |
| 5,513,246 A | 4/1996 | Jonsson et al. |
| 5,539,744 A | 7/1996 | Chu et al. |
| 5,640,414 A * | 6/1997 | Blakeney et al. ............ 375/130 |
| 5,640,676 A | 6/1997 | Garncarz et al. |
| 5,650,770 A | 7/1997 | Schlager et al. |
| RE35,916 E | 10/1998 | Dennison et al. |
| 5,901,354 A | 5/1999 | Menich et al. |
| 5,963,130 A | 10/1999 | Schlager et al. |
| 5,982,758 A | 11/1999 | Hamdy |
| 6,026,301 A | 2/2000 | Satarasinghe |
| 6,075,989 A | 6/2000 | Moore et al. |
| 6,088,594 A | 7/2000 | Kingdon et al. |
| 6,151,498 A | 11/2000 | Roel-Ng et al. |
| 6,167,268 A | 12/2000 | Souissi et al. |
| 6,195,342 B1 | 2/2001 | Rohani |
| 6,198,390 B1 | 3/2001 | Schlager et al. |
| 6,285,874 B1 | 9/2001 | Magnusson et al. |
| 6,321,090 B1 | 11/2001 | Soliman |
| 6,324,404 B1 | 11/2001 | Dennison et al. |
| 6,351,642 B1 * | 2/2002 | Corbett et al. ............. 455/442 |
| 6,360,098 B1 | 3/2002 | Ganesh et al. |
| 6,363,255 B1 | 3/2002 | Kuwahara |
| 6,449,305 B1 | 9/2002 | Menich et al. |

(Continued)

OTHER PUBLICATIONS

Akyildiz et al., "Mobility Management in Next-Generation Wireless Systems," Proceedings of the IEEE, vol. 87, No. 8, pp. 1347-1384, Aug. 1999.

(Continued)

*Primary Examiner* — Patrick Edouard
*Assistant Examiner* — Fred Casca (57) ABSTRACT

A mobile station will sort wireless coverage sectors in order of distance of the sectors from the mobile station, and the mobile station will then scan for pilot signals from the sectors in the sorted order. The invention can be applied advantageously to provide an order of scanning remaining set sectors in a mobile station operating according to a code division multiple access protocol.

15 Claims, 4 Drawing Sheets

U.S. PATENT DOCUMENTS

| | | | |
|---|---|---|---|
| 6,473,619 | B1 | 10/2002 | Kong et al. |
| 6,498,785 | B1 | 12/2002 | Derryberry et al. |
| 6,522,888 | B1 | 2/2003 | Garceran et al. |
| 6,549,781 | B1 * | 4/2003 | O'Byrne et al. .............. 455/446 |
| 6,570,862 | B2 | 5/2003 | Virtanen |
| 6,594,253 | B1 | 7/2003 | Sallberg et al. |
| 6,597,906 | B1 | 7/2003 | Van Leuwen et al. |
| 6,631,263 | B1 | 10/2003 | Corkery |
| 6,667,962 | B1 | 12/2003 | Lee et al. |
| 6,714,789 | B1 | 3/2004 | Oh et al. |
| 6,731,622 | B1 | 5/2004 | Frank et al. |
| 6,898,433 | B1 * | 5/2005 | Rajaniemi et al. ......... 455/456.1 |
| 6,934,546 | B1 | 8/2005 | Corbett et al. |
| 2002/0027889 | A1 | 3/2002 | Yun et al. |
| 2002/0102976 | A1 | 8/2002 | Newbury et al. |
| 2002/0198004 | A1 | 12/2002 | Heie et al. |
| 2003/0017831 | A1 | 1/2003 | Lee et al. |
| 2003/0017837 | A1 | 1/2003 | Kalliojarvi |
| 2004/0203780 | A1 | 10/2004 | Julka et al. |
| 2005/0228860 | A1 * | 10/2005 | Hamynen et al. ............. 709/203 |
| 2007/0184836 | A1 * | 8/2007 | He ............................... 455/434 |
| 2008/0222294 | A1 * | 9/2008 | Liang ........................... 709/227 |

OTHER PUBLICATIONS

Angus, "ReFLEX™ & IEEE 802.11—How ReFLEX NPCS Networks Can Make Wi-Fi Better," http://www.braddye.com/ReFLEX_802_4s.pdf, printed from the World Wide Web on Jan. 23, 2004.

Angus, "ReFLEX™ & IEEE 802.11—How ReFLEX NPCS Networks Can Make Wi-Fi Better," printed from the World Wide Web on Oct. 28, 2003.

Garg, et al., "Applications of CDMA in Wireless/Personal Communications," Prentice Hall PTR, Chapter 13, pp. 334-336, 1997.

La Porta, et al., "Comparison of Signaling Loads for PCS Systems," http://citeseer.nj.nec.com/cache/papers/cs/11341/http:zSzzSzwwww.bell-labs.comzSzuserzSztlpzSzpcs_Id.fm.pdf/porta95comparison.pdf, printed from the World Wide Web on Oct. 28, 2003.

Lin, "Comparing Soft and Hard Handoffs," http://citeseer.nj.nec.com/cache/papers/cs/8464/http:zSzzSzliny.csie.nctu.edu.twzSztv97c.pdf/submitted-to-ieee-trans.pdf, printed from the World Wide Web on Oct. 28, 2003.

Ramjee et al., "Performance Evaluation of Connection Rerouting Schemes for ATM-Based Wireless Networks," IEEE/ACM Transactions on Networking, vol. 6, No. 3, pp. 249-261, Jun. 1998.

Ramjee, "Supporting Connection Mobility in Wireless Networks," Dissertation submitted to the Graduate School of the University of Massachusetts Amherst in partial fulfillment of the requirements for the degree of Doctor of Philosophy, pp. 1-154, May 1997.

Trotter and Cravatts, "A Wireless Adapter Architecture for Mobile Computing," http://www.usenix.org/publications/library/proceedings/mob95/full_papers/trotter.txt, printed from the World Wide Web on Oct. 28, 2003.

Oh, "5. CDMA . . . ," http://edu.hansung.ac.kr/~jtoh/mobile/ch5.ppt, printed from the World Wide Web on Dec. 16, 2003.

Das et al., "Dynamic Load Balancing Through Coordinated Scheduling in Packet Data Systems," http://www.ieee-infocom.org/2003/papers/19_04.PDF, printed from the World Wide Web on Dec. 16, 2003.

Bedell, a reference excerpt taken from the book titled "Cellular/PCS Management: A Real World Perspective," http://www.privateline.com/Cellbasics/CDMAmanage.pdf, printed from the World Wide Web on Oct. 28, 2003.

* cited by examiner

METHOD AND APPARATUS FOR SCANNING SECTORS IN ORDER OF DISTANCE FROM MOBILE STATION

FIELD OF THE INVENTION

The present invention relates to wireless communications and, more particularly, to management of sector scanning.

BACKGROUND

Cellular wireless is an increasingly popular means of personal communication in the modern world. People are using cellular wireless networks for the exchange of voice and data over cellular telephones, Personal Digital Assistants ("PDAs"), cellular modems, and other devices. In principle, a user can seek information over the Internet or call anyone over a Public Switched Telephone Network ("PSTN") from any place inside the coverage area of the cellular wireless network.

In a typical cellular wireless system, an area is divided geographically into a number of cell sites provided by a radio access network (RAN). The RAN typically comprises one or more base transceiver stations (BTSs), each of which has one or more antennas that radiate to define a radio frequency (RF) radiation pattern. The BTS(s) of the RAN may then be coupled with a base station controller (BSC) or radio network controller (RNC), which may in turn be coupled with a telecommunications switch or gateway, such as a mobile switching center (MSC) or packet data serving node (PDSN) for instance. The switch or gateway may then provide connectivity with a transport network, such as the public switched telephone network (PSTN) or the Internet for instance.

When a mobile station (such as a cellular telephone, a wirelessly equipped PDA or personal computer, or another suitably equipped device) is positioned in a cell, the mobile station communicates via an RF air interface with the BTS of the cell. Consequently, a communication can be established between the mobile station and another entity, via the air interface and the RAN.

With the explosive growth in demand for wireless communications, the level of call traffic in most cell sites has increased drastically over recent years. To help manage the call traffic, most cells in a wireless network are usually further divided geographically into a number of sectors (which can be visualized ideally as pie pieces), each defined respectively by radiation patterns from directional antenna components of the respective BTS, or by respective BTS antennae. As such, each sector has an azimuth, which is understood to be the general direction of radiation of the sector, such as the direction the antenna of the sector is pointing.

In a Code Division Multiple Access (CDMA) wireless network and perhaps in other types of networks, each cell employs one or more carrier frequencies, and each sector is distinguished from adjacent sectors by a pseudo-random number offset (PN offset). Further, each sector may concurrently communicate on multiple different channels, distinguished by "Walsh codes". When a mobile station operates in a given sector, communications between the mobile station and the BTS of the sector are carried on a given frequency and are encoded by the sector's PN offset and, perhaps, a given Walsh code.

According to well known industry standards, a mobile station can communicate with a number of "active" sectors at a time. Depending on the system, the number of active sectors may be up to three or six, for instance. The mobile station receives largely the same signal from each of the active sectors and, on a frame-by-frame basis, may select the best signal to use.

A mobile station maintains in its memory a list of the sectors in its "active" set. In addition, it maintains in its memory a list of "candidate" sectors (e.g., up to six), which are those sectors that are not yet in the active set but that have sufficient signal strength that the mobile station could demodulate signals from those sectors. Further, the mobile station maintains a list of "neighbor" sectors, which are those sectors not in the active set or candidate set but are in close vicinity to the mobile station. All other possible sectors are members of a "remaining" set.

In existing systems, to facilitate a determination of which sectors should be in the mobile station's active set, all base stations emit a pilot channel signal on each sector, typically at a power level higher than other downlink signals. A mobile station then constantly measures the strength ($E_c/I_o$, i.e., energy versus spectral density) of each pilot that it receives and notifies the RAN (e.g., a BSC serving the mobile station) when pilot strength falls above or below designated thresholds. The RAN, in turn, provides the mobile station with an updated list of active pilots.

In one arrangement, for instance, the RAN may initially transmit to the mobile station (e.g., over a downlink control channel or traffic channel) a Handoff Direction Message (HDM), containing parameters such as (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the RAN may initially provide the mobile station with a Neighbor List Update Message (NLUM), which identifies the "neighbor" sectors for the current active set.

The mobile station may then monitor all of the pilot signals that it receives, and the mobile station may determine if any neighbor pilot exceeds T_ADD by T_COMP. If so, the mobile station may add the pilot to its "candidate" set and send a Pilot Strength Measurement Message (PSMM) to the base station, indicating the estimated $E_c/I_o$ for the pilot, with the pilot designated by PN offset. Depending on current capacity and other issues, the RAN may then agree to allow the mobile station to hand off to the designated sector. Accordingly, the RAN may reserve a channel resource (such as a Walsh code) in the sector and may send to the mobile station an HDM listing the pilot as a new member of the mobile station's active set and directing the mobile station to use the reserved channel resource in the added sector. Further, the RAN may send to the mobile station a new NLUM, designating a new neighbor list corresponding to the mobile station's revised active set.

Upon receipt of the HDM, the mobile station would then add the pilot to its active set as instructed, and the mobile station would send a Handoff Completion Message (HCM) to the RAN, acknowledging the instruction, and providing a list of the pilots (PN offsets) in its active set, thereby completing the handoff.

Similarly, if the mobile station detects that the signal strength of a pilot in its active set drops below T_DROP, the mobile station may start a handoff drop timer. If T_TDROP passes, the mobile station may then send a PSMM to the RAN, indicating the $E_c/I_o$ and drop timer, and similarly designating the pilot by PN offset. The RAN may then respond by sending an HDM to the mobile station, without the pilot in the active set. And the mobile station may then receive the HDM and responsively move the pilot to its neighbor set and send an HCM to the RAN. Further, the base station may likewise send a new NLUM to the mobile station to update the mobile station's neighbor list.

In typical practice, the neighbor list that the RAN provides to the mobile station will list neighbor sectors in a priority order, with sector priorities usually defined in advance (e.g., by network engineers) based on the likelihood of handoff to the sectors. For instance, if a neighbor sector is directly adjacent to a sector in the mobile station's active set, the neighbor sector may have a higher priority and may therefore be listed higher in the priority ordered neighbor list. On the other hand, if a neighbor sector is more distant from the sectors in the mobile station's active set, then it may have a lower priority in the list. When the RAN generates a neighbor list to send to a mobile station, the RAN may programmatically sort the list based on these handoff priorities with respect to the members of the mobile station's active set.

In operation, a mobile station will then cyclically scan for pilot signals from the various sectors in its active, candidate, neighbor, and remaining sets. In particular, the mobile station will usually (i) scan all of its active and candidate sectors and then scan a first (highest priority) sector from its neighbor set, (ii) scan all of its active and candidate sectors again and then scan a next (next priority) sector from its neighbor set, and so forth until the mobile station has scanned all of its neighbor set sectors. At that point, the mobile station will then scan one of its remaining set sectors. In turn, the mobile station will then repeat the process, scanning another remaining set sector, and so forth.

Under current procedures, as a mobile station carries out this scanning process, the mobile station will scan the remaining set sectors in numerical PN-offset order, merely for purposes of keeping track of which sectors have been scanned so far.

SUMMARY

The present invention improves over existing procedures by having a mobile station scan its remaining set sectors in order of the distance of those sectors from the mobile station, first scanning the closest remaining set sector, then the next closest, and so forth. The inventors believe that this distance based scanning mechanism will help reduce the occurrence of dropped calls, since the mechanism will enable the mobile station to more quickly detect a quality pilot signal from a closer remaining set sector that is more likely than other sectors to serve the mobile station.

In accordance with an exemplary embodiment of the invention, a mobile station will maintain a list of sectors and their respective locations (e.g., base station tower locations, sector centroid locations, or other representation of sector locations). For instance, the BSC serving the mobile station may transmit to the mobile station a list of sectors and their locations, or the mobile station could be programmed with the list in much the same way that a mobile station is typically programmed with a preferred roaming list (PRL).

The mobile station will then filter that list, if necessary, to exclude sectors that are in the mobile station's active set, candidate set, and neighbor set. Further, the mobile station will determine its own location, such as by using a GPS receiver and possibly through communication with location-determination infrastructure operated by the radio access network provider. The mobile station will then sort the list of sectors in order of distance of the sectors from the mobile station's location. And the mobile station will then scan the sectors of the list in order sorted, from closest to the mobile station to farthest from the mobile station.

This improvement can operate in the context of the existing sector scanning process as described above for instance, to provide a remaining set that is sorted in order of distance of sectors from the mobile station. As such, the improvement can help a mobile station more readily detect a quality pilot signal from a closer sector in its remaining set, and the improvement may help to reduce the occurrence of dropped calls.

These as well as other aspects and advantages will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
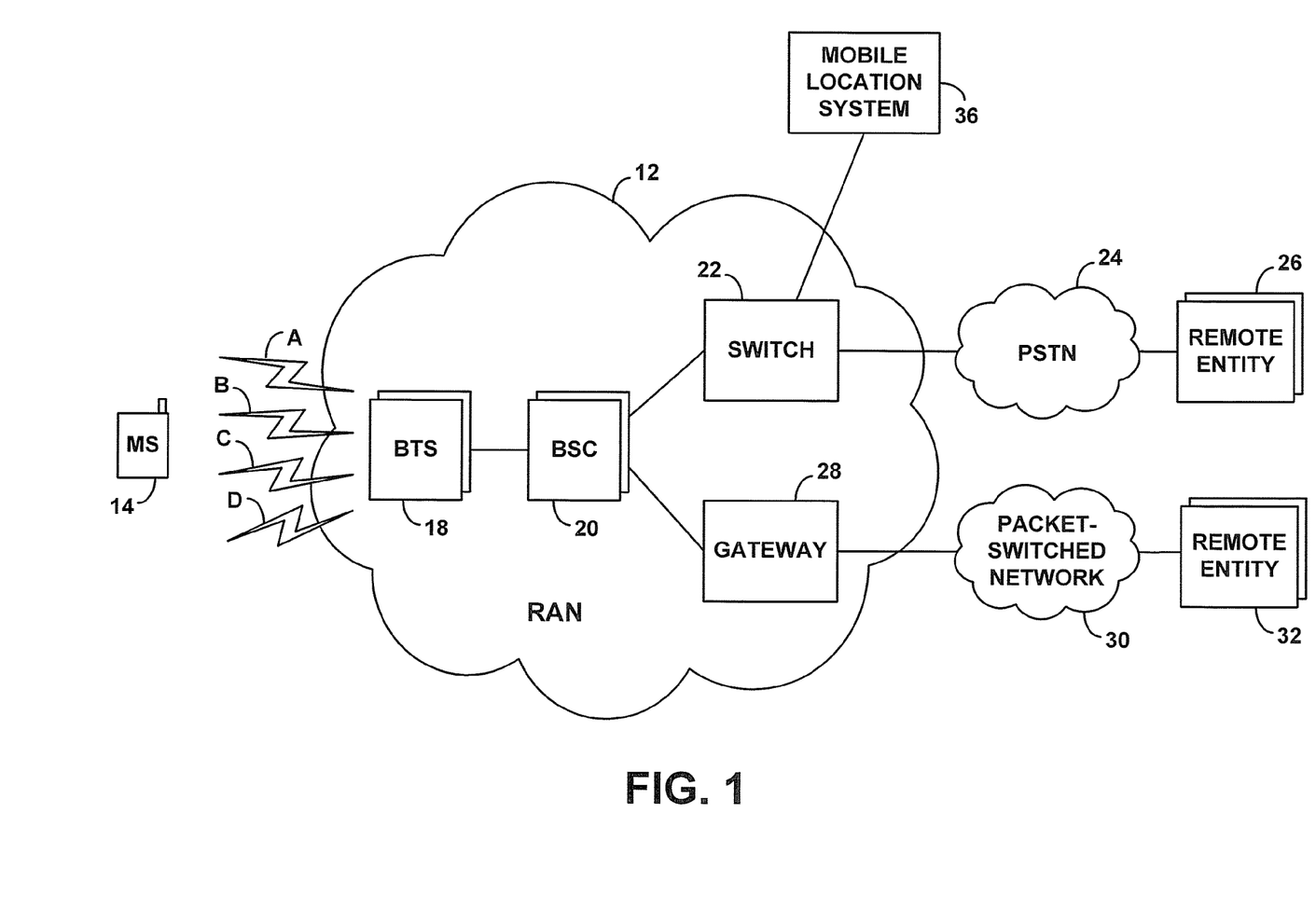
FIG. 1 is a simplified block diagram of a communication system in which an exemplary embodiment of the invention can be applied.

Referring to the drawings, FIG. 1 depicts a cellular communication system in which aspects of the exemplary embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts one representative mobile station 14 by way of example, which could be a cell phone, wirelessly equipped PDA, or any other type of wirelessly-equipped device now known or later developed. As will be described more below, the mobile station is equipped with hardware, software, and/or other logic to communicate with RAN 12 in accordance with an agreed communication protocol, such as CDMA (e.g., IS-95, IS-2000, 1×RTT, 1×EV-DO, etc.), iDEN, WiMAX, TDMA, AMPS, GSM, GPRS, UMTS, EDGE, or any other communication protocol now known or later developed.

RAN 12 defines a plurality of sectors (i.e., any wireless coverage areas established by reference to base station emissions or the like) in which mobile stations can communicate with the RAN. In particular FIG. 1 shows the RAN radiating to define at least four sectors, labeled respectively A, B, C, and D, although the RAN can define any number of sectors (with at least two that end up defining the set to be sorted in accordance with the invention). The RAN may define these sectors discretely through use of directional antennas and/or by various modulation parameters, including, without limitation, carrier frequencies and PN offsets or other parameters, depending on the air interface protocol used. In practice, the sectors may overlap to some extent, so that a served mobile station can communicate with multiple sectors when at particular location.

The RAN can take various forms and may include any of a variety and number of components, depending for instance on the air interface protocol employed by the RAN. For example, the RAN may include one or more base transceiver stations (BTSs) 18 and one or more base station controllers (BSCs) 20 (also sometimes referred to as radio network controllers (RNCs)). The BTSs preferably include directional antennas, power amplifiers, and associated transceiver equipment arranged to establish the sectors shown and to communicate with served mobile stations. As such, some or all of sectors A, B, C, and D may emanate from a single BTS (i.e., a single cell site), or various ones of the sectors may emanate from separate BTSs.

In turn, each BSC 20 may control one or more BTSs and may manage aspects of air interface operation. For instance, a BSC may manage assignment of air interface traffic channels to mobile stations in response to mobile station origination messages. Further, the BSC may manage handoff of mobile stations between sectors, by engaging in control channel signaling such as that described above. For instance, the BSC may first transmit to the mobile station a neighbor list for the mobile station's initially selected sector. The BSC may then receive PSMMs from the mobile station, reporting on pilot signal strengths detected by the mobile station, and the BSC may send HDMs to the mobile station, directing the mobile station to add or remove particular sectors from the mobile station's active set, i.e., to hand off from one sector to another as described above.

Each BSC may be coupled with a mobile switching center (MSC) or other switch 22 that provides connectivity with the public switched telephone network (PSTN) 24 if applicable, so that served mobile stations can communicate with remote entities 28 on the PTSN. And each BSC may be coupled with a packet data serving node (PDSN) or other gateway 30 that provides connectivity with a packet-switched network 32 if applicable, so that served mobile stations can communicate with remote entities 34 on the packet-switched network.

The example communication system of FIG. 1 also includes a mobile positioning system that facilitates determination of the location of mobile stations in accordance with well known principles. As shown in FIG. 1, for instance, a mobile location system (MLS) 36 can be linked with MSC 22 or another RAN element via a signaling network and/or via a general packet-data network. The MLS 36 may function as a location server, able to maintain records of mobile station location and to report mobile station locations to querying entities. Further, the MLS may enable the mobile station itself to determine its own location.

For high precision location determination, the MLS 36 may engage in signaling with the mobile station, according to well known industry standard IS-801 for example. In that process, the mobile station may report cellular signal measurements to the MLS, the MLS may use those measurements to determine roughly where the mobile station is located, and the MLS may then provide the mobile station with appropriate satellite assistance data to enable the mobile station to tune to particular satellites in its area. Based on signals that the mobile station then receives from those satellites, either the mobile station or the MLS may then compute the mobile station's location with a high degree of accuracy.

Figure 2:
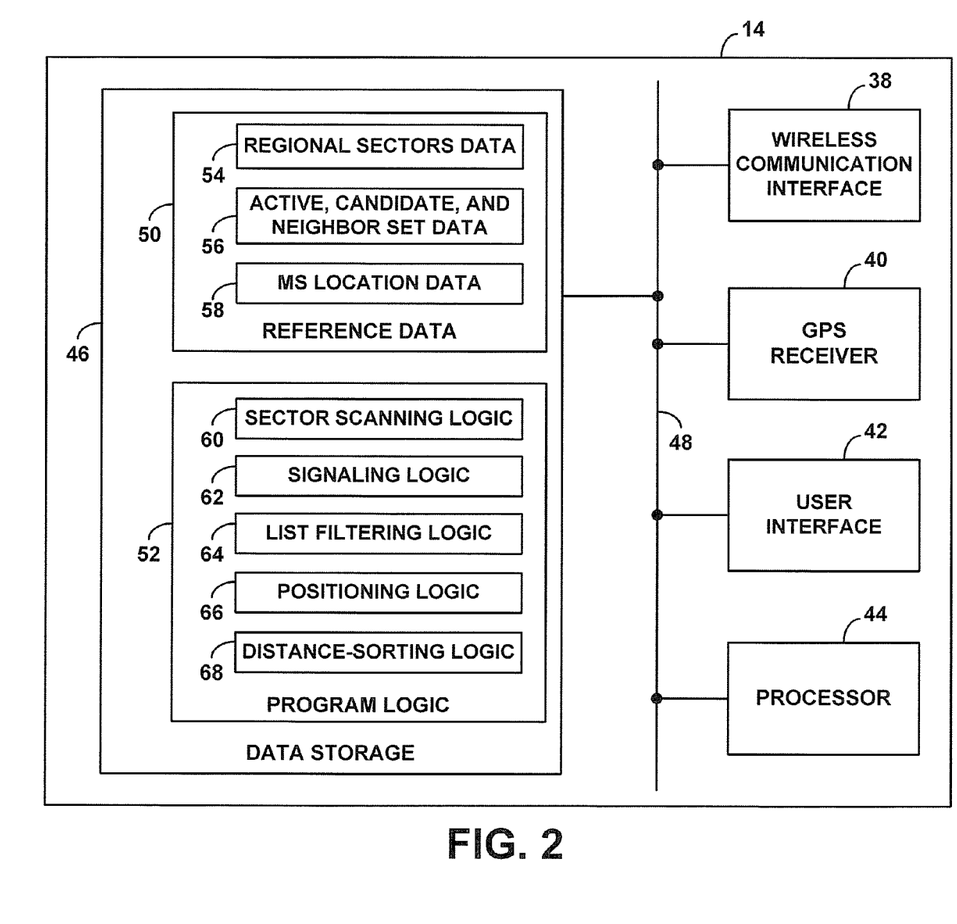
FIG. 2 is a simplified block diagram of a mobile station operable within the exemplary embodiment.

FIG. 2 is a simplified block diagram showing some of the functional components that can be included in mobile station 14 in accordance with exemplary embodiment. As shown, the exemplary mobile station includes a wireless communication interface 38, a GPS receiver 40, a user interface 42, a processor 44, and data storage 52, all of which may be communicatively linked together by a system bus, network, or other connection mechanism 48. The mobile station may take other forms as well.

Wireless communication interface 38 functions to facilitate air interface communication with RAN 12 according to one or more protocols such as those noted above. In the preferred embodiment, wireless communication interface 38 supports CDMA communication. As such, the wireless communication interface 38 preferably includes a transceiver having a rake receiver (not shown) of the type well known in the art, which enables mobile station 14 to tune to particular PN offsets, so as to facilitate scanning various sectors, and so forth. An exemplary wireless communication interface is an MSM series chipset manufactured by Qualcomm Incorporated, together with one or more internal or external antennas.

GPS receiver 40 functions communicate with GPS satellites, so as to facilitate determination of the location of mobile station 14. As described above, for instance, the mobile station may obtain satellite assistance data from MLS 36 and, in accordance with that data, may tune to various satellites and measure received satellite signals. With use of the assistance data, the mobile station may then geometrically compute its own location based on the measured satellite signals. Alternatively, the mobile station may provide the satellite signal measurements to the MLS, and the MLS may compute the mobile station's location. Although GPS receiver 40 is shown separate from wireless communication interface 38, the GPS receiver function can be integrated together with the wireless communication interface function, on a single chipset for instance. By way of example, the chipset could be a Qualcomm CDMA chipset having "gpsOne" functionality.

User interface 42 includes components for receiving input from a user of mobile station and providing output to a user of the mobile station. For instance, the user interface may include a keypad, touch-sensitive screen, microphone, and camera for receiving user input, and a display screen and speaker for providing user output. Further, the user interface 42 may include analog/digital conversion circuitry to facilitate conversion between analog user input/output and digital signals on which the mobile station can operate.

Processor 44 comprises one or more general purpose processors (such as INTEL processors or the like) and/or one or more special purpose processors (such as digital signal processors or application specific integrated circuits). To the extent processor 44 includes more than one processor, the processors could work separately or in combination. Data storage 46, in turn, comprises one or more volatile or non-volatile storage components, such as optical, magnetic, or organic storage, and data storage 46 can be integrated in whole or in part with processor 44.

As shown, the data storage 46 of the exemplary mobile station includes reference data 50 and program logic 52. The reference data may include, among other data, (i) active, candidate, and neighbor set data 54, (ii) regional sectors data 56, and (iii) mobile station location data 58.

The active, candidate, and neighbor set data 54 comprises the mobile station's active set, candidate set, and neighbor set (or analogous data if a different air interface protocol is being used). This data can be established and have the meaning as described above for instance.

The regional sectors data 56 comprises a list of all sectors in the mobile station's region together with a geographic location of each sector. As such, the sectors that are included in this list could be those within a predefined distance of the mobile station's current location or could be all sectors within the system in which the mobile station is currently operating.

It is this list of sectors that the mobile station can filter to exclude those sectors that are listed in the mobile station's active, candidate, and neighbor sets, so as to establish a remaining set that the mobile station can sort in accordance with the invention. As noted above, the mobile station can be pre-provisioned with this regional sectors data 56, much like the mobile station is provisioned with a PRL. Alternatively, the RAN may transmit the regional sectors data 56 to the mobile station, in a control channel signal (e.g., in a system parameters message) or a traffic channel transmission for instance, after first determining the mobile station's location and then selecting as members of the regional sectors data 56 those sectors within the mobile station's region. (A BSC or other RAN entity could compile the regional sectors data 56 by executing program instructions stored in data storage, or applying other appropriately arranged logic.)

The mobile station location data 58 comprises an indication of the mobile station's location, which the mobile station can use as a basis for sorting the sectors of the remaining set in their order of distance from the mobile station in accordance with the exemplary embodiment.

Program logic 52, in turn, may comprise machine language instructions or other logic executable or interpretable by processor 44 to carry out various functions described herein. As shown, for instance, the program logic 52 may include (i) sector scanning logic 60, (ii) signaling logic 62, (iii) list filtering logic 64, (iv) positioning logic 66, and (v) distance-sorting logic 68. Given that many of these functions relate to wireless communication functions and location-determination, the program logic control operation of wireless communication interface 38 and GPS receiver 40. Alternatively or additionally, the program logic could be provided as firmware or other logic integrated directly within wireless communication interface 38 or GPS receiver 40. Other arrangements are possible as well.

Sector scanning logic 60 functions to scan pilots of various sectors (such as all of those in the regional sectors data 56), in search of a sector in which the mobile station can operate. During a call, for instance, this process may occur as described above, with the mobile station iteratively scanning all active and candidate set sectors, one neighbor set sector, all active and candidate set sectors again, a next neighbor set sector, and so forth until all neighbor sectors are scanned, and then scanning one of the remaining set sectors.

Signaling logic 62 functions to engage in control signaling with RAN 12, such as with BSC 20 or other entities, via wireless communication interface 38. This signaling may include the above-discussed PSMM, HDM, HCM, and NLUM signaling for instance, among a variety of other signaling. Thus, when the mobile station detects a sufficiently strong pilot while engaged in a call, the mobile station may send a PSMM message (or the like) to the RAN and may receive HDM and NLUM messages in response from the RAN, updating the mobile station's active set and neighbor set. The mobile station then newly apply the exemplary process to sort a remaining set in order of distance.

List-filtering logic 64 functions to filter the sectors in the mobile station's region to exclude those that are in the mobile station's active set, candidate set, and neighbor set (or to filter the a list of sectors in any other way specified), so as to establish a remaining set. In practice, the list-filtering logic 64 may operate as a simple database query of the regional sector set designating all members of the regional sector set except for those in the active set, candidate set, and neighbor set.

Positioning logic 66 functions to determine the mobile station's location and may operate in the manner described above. For instance, the positioning logic may operate to report cellular signal measurements to MLS 36, to receive satellite assistance data in response from the MLS, to tune to and receive satellite signals in accordance with the assistance data, and the use the received satellite signals in a known manner to geometrically compute the location of the mobile station. Alternatively, the positioning logic 66 could report satellite signal measurements to MLS 36, and the MLS could determine and return the mobile station's location. Positioning logic 66 could function to determine the mobile station's location in any other manner now known or later developed as well.

Distance-sorting logic 68 (which may be considered a type of sector management logic) functions, in accordance with the exemplary embodiment, to sort the remaining set sectors in order of their distance from the mobile station. As such, for each sector in the remaining set, the distance-sorting logic 68 compares the location of the mobile station as determined by positioning logic 66 with the location of the remaining set sector as indicted initially by the regional sectors data 56, so as to determine a distance between the mobile station and the sector. The distance could be the length of a straight line geometrically extending from the sector location coordinates to the mobile station location coordinates. Alternatively or additionally, the distance could consider other coordinates and parameters. For instance, a sector whose azimuth points more directly at the mobile station than another sector could be considered to have a shorter "angular distance" to the mobile station than the other sector has to the mobile station. Other examples are possible as well.

In accordance with the exemplary embodiment, sector scanning logic 60 will scan remaining set sectors in the order sorted by distance-sorting logic 68. Thus, for instance, the first time the sector scanning logic 60 finishes scanning the neighbor list (with a full active and candidate set scan between each neighbor sector scan), the sector scanning logic 60 may scan a closest remaining set sector; and each subsequent time the sector scanning logic 60 finishes scanning the neighbor list, the sector scanning logic may scan a next closest remaining set sector. This process could continue until the sector scanning logic has scanned all remaining set sectors, out to the most distant one. However, if at any time the mobile station's active set, candidate set, or neighbor set changes, the process may begin again, starting with the closest remaining set sector, and so forth. On the other hand, the exact procedure for scanning the distance-sorted sector list could vary from this.

Figure 3:
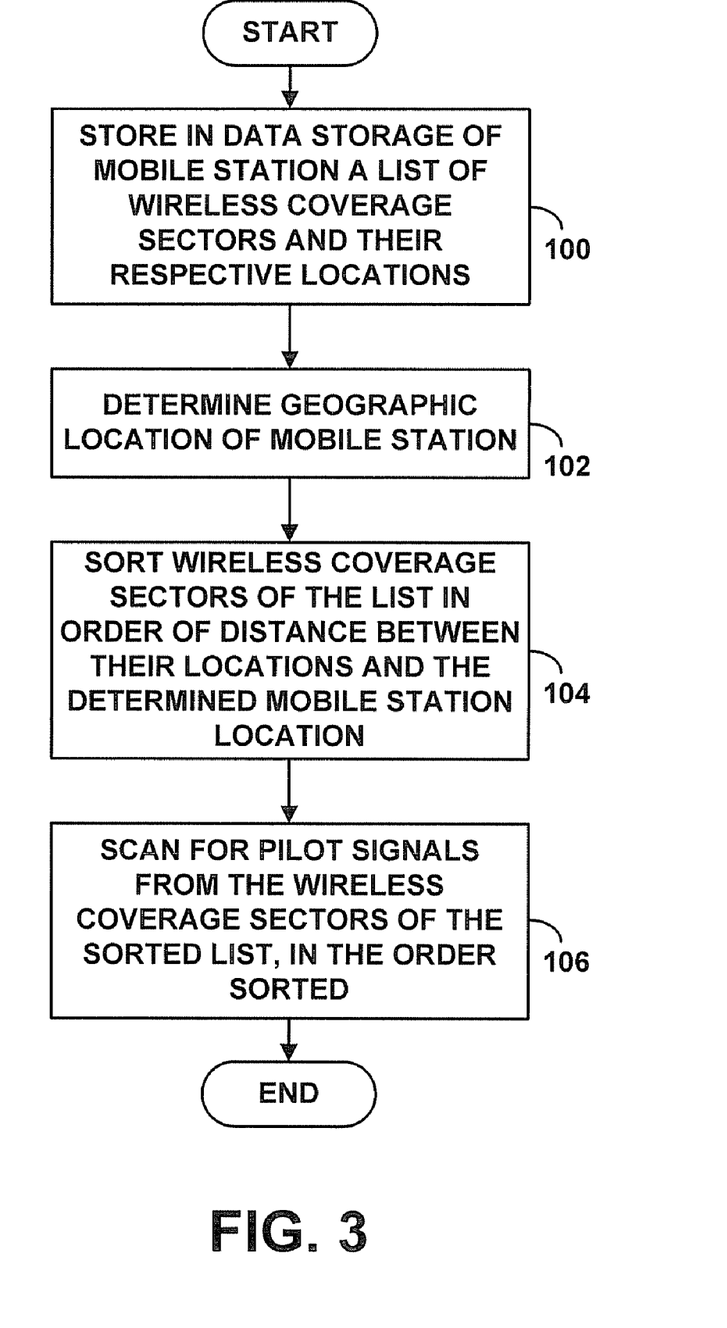
FIG. 3 is a flow chart depicting functions that can be carried out in accordance with the exemplary embodiment.

FIG. 3 is a flow chart depicting in summary a set of functions that can be carried out in accordance with the exemplary embodiment. As shown in FIG. 3, at step 100, the exemplary method involves storing in data storage of the mobile station a list of wireless coverage sectors and their respective locations. This list can be the mobile station's remaining set, for instance. At step 102, the method then involves determining a geographic location of the mobile station, using a GPS system as described above for example. In turn, at step 104, the method involves sorting the wireless coverage sectors of the list in order of distance between their locations and the determined mobile station location, so as to produce a sorted list of wireless coverage sectors. And at step 106, the method involves scanning for pilot signals from the wireless coverage sectors of the sorted list, in the order sorted.

In one embodiment, the remaining set sectors could be sorted based on their distances from the mobile station, so that the remaining set sectors can be scanned in order of their distances. In another embodiment, the regional sectors (defined by regional sectors data 54) could be sorted based on their distances from the mobile station, before the regional set is filtered to exclude the active, candidate, and neighbor set sectors. Other arrangements are possible as well. In either case, the list of wireless coverage sectors that the mobile station stores and sorts as shown in FIG. 3 could be received wirelessly from the mobile station's serving RAN. (If the list is just the remaining set, then what is received from the RAN could be the list plus more, cooperatively defining the regional set.) The act of storing the list of wireless coverage sectors and their locations may then involve storing the list of wireless coverage sectors and their locations in response to receipt of the list of wireless coverage sectors and their locations from the RAN.

Optimally, the method of FIG. 3 can be would be carried out while the mobile station is actively engaged in a call (such as a voice call or data communication session) via the radio access network. The method would be particularly advantageous in that situation, as the invention may help to reduce the likelihood that the mobile station will experience a dropped call.

Figure 4:
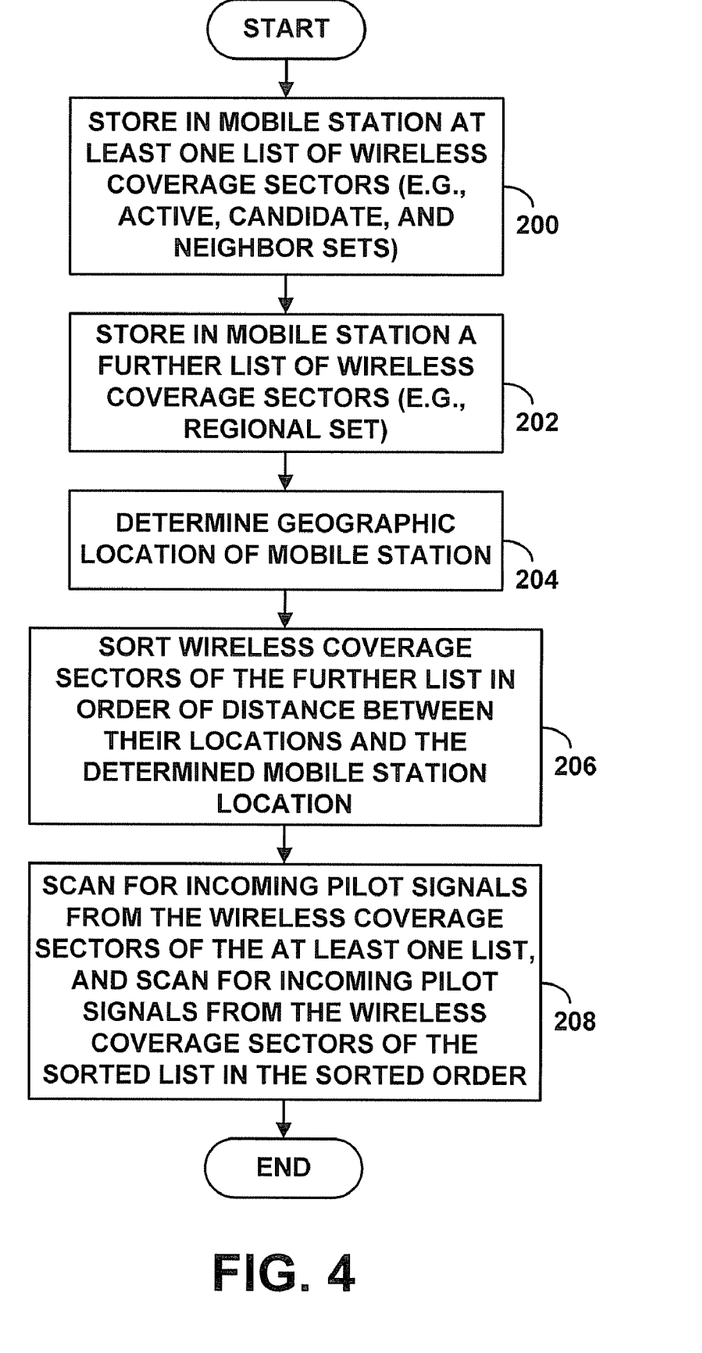
FIG. 4 is another flow chart depicting functions that can be carried out in accordance with the exemplary embodiment.

FIG. 4 is next a flow chart depicting in summary another set of functions that can be carried out in accordance with the exemplary embodiment. As shown in FIG. 4, at steps 200 and 202, the method involves storing in data storage of a mobile station at least one list of wireless coverage sectors, and storing in data storage of the mobile station a further list of wireless coverage sectors and their locations. The "at least one list" may comprise (i) an active set of one or more sectors, (ii) a candidate set of one or more sectors, and (iii) a neighbor set of one or more sectors, or may take other forms. The "further list" may then comprise a regional sector set as described above for instance, or may also take other forms.

At step 204, the method then involves determining a geographic location of the mobile station. In turn, at step 206, the method involves sorting wireless coverage sectors of the further list in order of distance between their locations and the determined mobile station location, so as to produce a sorted list of wireless coverage sectors. And at step 208, the method involves the mobile station scanning for incoming pilot signals from the wireless coverage sectors of the at least one list, and scanning for incoming pilot signals from the wireless coverage sectors of the sorted list in the sorted order. For instance, the mobile station may scan sectors in the manner described above, scanning one remaining set sector after each cycle through neighbor sectors (with full active/candidate scans between each neighbor), with the remaining set sectors being scanned in order from closest to the mobile station to farthest from the mobile station.

In this method, act of scanning for incoming pilot signals from the wireless coverage sectors of the at least one list may then involve scanning for incoming pilot signals from the wireless coverage sectors of the active set, of the candidate set, and of the neighbor set, in the conventional manner described above for instance. Further, the act of sorting the wireless coverage sectors of the further list in order of distance between their locations and the determined mobile station location may involve (a) filtering the further list to exclude wireless coverage sectors that are in any of the active set, the candidate set, and the neighbor set, so as to establish a remaining set, (b) for each remaining wireless coverage sector in the remaining set, determining a distance between the wireless coverage sector's location and the determined location of the mobile station, and (c) sorting the wireless coverage sectors of the remaining set in order from closest to the mobile station to farthest from the mobile station, to produce the sorted list.

As in the method above, this method may additionally involve receiving into the mobile station, wirelessly transmitted from a radio access network serving the mobile station, the further list of wireless coverage sectors and their locations. (Alternatively, the mobile station could be pre-provisioned with such data, and the mobile station could even limit the data based on geographic proximity to the mobile station.) In that case, as noted above, the act of storing the further list of wireless coverage sectors and their locations may involve storing the further list of wireless coverage sectors and their locations in response to receipt of the further list of wireless coverage sectors and their locations from the radio access network.

In practice, the radio access network may thus establish the further list of wireless coverage sectors and send the further list to the mobile station. For instance, as noted above, one or more entities in the radio access network (e.g., a BSC or MSC) may determine a location of a wireless coverage sector from which the mobile station has reported a strongest pilot signal and may select, as members of the further list, wireless coverage sectors that are within a predefined distance of the determined location of that wireless coverage sector. In this regard, the radio access network may receive pilot signal strength reports (e.g., PSMMs) wirelessly transmitted from the mobile station, each pilot signal strength report indicating a wireless coverage sector and a corresponding pilot signal strength, and the radio access network may identify a wireless coverage sector that has the highest pilot signal strength indicated by the pilot signal strength reports from the mobile station and may determine (e.g., by a simple lookup) the location of that wireless coverage sector.

In the exemplary method, at least some of the wireless coverage sectors at issue will be CDMA sectors, and the invention may be applied with respect to remaining set sectors. However, the invention may apply as well with respect to other air interface protocols, and with respect to other sets of sectors (or, for that matter, other types of wireless coverage areas) as well.

An exemplary embodiment of the invention has been described above. Those of ordinary skill in the art will appreciate, however, that modifications may be made while remaining within the scope of the invention as defined by the claims.

We claim:

1. In a mobile station, a method comprising:

storing in data storage of the mobile station a list of wireless coverage sectors and their respective locations;

determining a geographic location of the mobile station;

sorting wireless coverage sectors of the list in order of distance between their locations and the determined mobile station location, so as to produce a sorted list of wireless coverage sectors, wherein sorting wireless coverage sectors of the list in order of distance between their locations and the determined mobile station location, so as to produce a sorted list of wireless coverage sectors comprises (a) filtering the list to exclude wireless coverage sectors that are in any of an active set of the mobile station, a candidate set of the mobile station, and a neighbor set of the mobile station, (b) for each remaining wireless coverage sector in the list, determining a distance between the wireless coverage sector's location and the determined location of the mobile station, and (c) sorting the wireless coverage sectors of the list in order from closest to the mobile station to farthest from the mobile station, to produce the sorted list; and scanning for pilot signals from the wireless coverage sectors of the sorted list, in the order sorted.

2. The method of claim 1, further comprising:

receiving into the mobile station, wirelessly transmitted from a radio access network serving the mobile station, the list of wireless coverage sectors and their locations, wherein storing the list of wireless coverage sectors and their locations comprises storing the list of wireless coverage sectors and their locations in response to receipt of the list of wireless coverage sectors and their locations from the radio access network.

3. The method of claim 2, further comprising carrying out the method while the mobile station is actively engaged in a call via the radio access network.

4. The method of claim 3, wherein receiving the list from the radio access network comprises receiving the list as data via an air interface traffic channel from the radio access network.

5. The method of claim 1, wherein determining a geographic location of the mobile station comprises using a global positioning system to determine the geographic location of the mobile station.

6. A method comprising:

storing in data storage of a mobile station at least one list of wireless coverage sectors, wherein the at least one list of wireless coverage sectors comprises (i) an active set of one or more sectors, (ii) a candidate set of one or more sectors, and (iii) a neighbor set of one or more sectors;

storing in data storage of the mobile station a further list of wireless coverage sectors and their locations;

determining a geographic location of the mobile station, and sorting wireless coverage sectors of the further list in order of distance between their locations and the determined mobile station location, so as to produce a sorted list of wireless coverage sectors, wherein sorting wireless coverage sectors of the further list in order of distance between their locations and the determined mobile station location, so as to produce a sorted list of wireless coverage sectors comprises (a) filtering the further list to exclude wireless coverage sectors that are in any of the active set, the candidate set, and the neighbor set, (b) for each remaining wireless coverage sector in the further list, determining a distance between the wireless coverage sector's location and the determined location of the mobile station, and (c) sorting the wireless coverage sectors of the further list in order from closest to the mobile station to farthest from the mobile station, to produce the sorted list;

the mobile station scanning for incoming pilot signals from the wireless coverage sectors of the at least one list, wherein scanning for incoming pilot signals from the wireless coverage sectors of the at least one list comprises scanning for incoming pilot signals from the wireless coverage sectors of the active set, of the candidate set, and of the neighbor set; and the mobile station scanning for incoming pilot signals from the wireless coverage sectors of the sorted list in the sorted order.

7. The method of claim 6, wherein scanning for incoming pilot signals from the wireless coverage sectors of the active set, of the candidate set, and of the neighbor set comprises:

(a) scanning for pilot signals from all wireless coverage sectors of the active set;
(b) scanning for pilot signals from all wireless coverage sectors of the candidate set;
(c) scanning for a pilot signal from a wireless coverage sector of the neighbor set;
(d) scanning for pilot signals from all wireless coverage sectors of the active set;
(e) scanning for pilot signals from all wireless coverage sectors of the candidate set;
(f) scanning for a pilot signal from another wireless coverage sector of the neighbor set; and
(g) repeating steps (d)-(f) until the mobile station has scanned for a pilot signal from each wireless coverage sector of the neighbor set.

8. The method of claim 6, further comprising:

receiving into the mobile station, wirelessly transmitted from a radio access network serving the mobile station, the further list of wireless coverage sectors and their locations, wherein storing the further list of wireless coverage sectors and their locations comprises storing the further list of wireless coverage sectors and their locations in response to receipt of the further list of wireless coverage sectors and their locations from the radio access network.

9. The method of claim 8, further comprising carrying out the method while the mobile station is actively engaged in a call via the radio access network.

10. The method of claim 9, wherein receiving the further list from the radio access network comprises receiving the further list as data via an air interface traffic channel from the radio access network.

11. The method of claim 8, further comprising:

establishing the further list of wireless coverage sectors in the radio access network, and sending the further list of wireless coverage sectors to the mobile station.

12. The method of claim 11, wherein establishing the further list of wireless coverage sectors comprises:

determining a location of a wireless coverage sector for which the mobile station has reported a strongest pilot signal; and selecting, as members of the further list, wireless coverage sectors that are within a predefined distance of the determined location of the wireless coverage sector.

13. The method of claim 12, wherein determining the location of the wireless coverage sector for which the mobile station has reported a strongest pilot signal comprises:

receiving pilot signal strength reports wirelessly transmitted from the mobile station, each pilot signal strength report indicating a wireless coverage sector and a corresponding pilot signal strength;

identifying a wireless coverage sector having the highest pilot signal strength indicated by the pilot signal strength reports from the mobile station; and determining the location of the identified wireless coverage sector.

14. The method of claim 6, wherein at least a plurality of the wireless coverage sectors are Code Division Multiple Access (CDMA) sectors.

15. The method of claim 6, wherein determining a geographic location of the mobile station comprises using a global positioning system to determine the geographic location of the mobile station.

* * * * *